Aug. 2, 1949.  F. M. RODDY  2,478,013
PROCESS FOR PREPARING AND FASHIONING THERMOPLASTIC
AND THERMOSETTING MATERIALS
Filed Feb. 9, 1942   4 Sheets-Sheet 2

Fig. 2

INVENTOR.
FRED M. RODDY
BY
W. Russell Greenwood
ATTORNEY

Aug. 2, 1949.   F. M. RODDY   2,478,013
PROCESS FOR PREPARING AND FASHIONING THERMOPLASTIC
AND THERMOSETTING MATERIALS
Filed Feb. 9, 1942   4 Sheets-Sheet 4

INVENTOR
FRED M. RODDY
BY W Russell Greenwood
ATTORNEY

Patented Aug. 2, 1949

2,478,013

UNITED STATES PATENT OFFICE 2,478,013

PROCESS FOR PREPARING AND FASHIONING THERMOPLASTIC AND THERMOSETTING MATERIALS

Fred M. Roddy, Providence, R. I.

Application February 9, 1942, Serial No. 430,016

3 Claims. (Cl. 18—55)

This invention relates to process for preparing thermoplastic and thermosetting materials into a plastic and workable state, and the fashioning of the plastic mass of these materials into desired articles either by injection of the plastic material into suitable molds to form the mass into desirable shapes by an injection molding operation, or by extrusion of the plastic material through suitable orifices in a die to form continuous lengths of the extruded material such as rods, tubes or strands of any desired shape or size.

The primary object of the invention is to provide a simple, quick and efficient method of preparing thermoplastic and thermosetting materials to a plastic state for both injection molding and for continuous extrusion operations without subjecting these materials to the application of prolonged contact heating at the high temperatures necessary to render them completely plastic and capable of being fashioned into molded articles or into extruded strands.

Another object of the invention is to soften the material to a state of moderate plasticity by the application of a preliminary heating treatment and then to produce a sudden increase in temperature in the semi-plastic mass to reduce it to a plastic state suitable for injection molding in molds into any desirable shapes or for extrusion through dies into strands.

According to the present invention I provide a process designed to operate upon the material to be treated in such a manner as to effect the dissipation of a controlled amount of pressure as the material in a moderately plastic state is forced through one or more orifices or restricted apertures to cause a very sudden, uniform and exact amount of temperature rise in the material to make it thoroughly plastic and easily flowable as it passes forward beyond the confines of this pressure dissipation device. The word "dissipation" is used in the sense of conversion or transformation of high-grade energy to low-grade energy or, more specifically, to the transfer or conversion of energy in the form of pressure to energy in the form of heat. The plasticizing process is performed in two stages in which the first stage consists of a preliminary heating step wherein the material is rendered moderately plastic before it enters the region or regions where the pressure-dissipation takes place. This preheating step is effected by causing the material to move through a heating zone wherein it is subjected to a relatively high temperature sufficient to bring the material to a condition of moderate plasticity or to a partially plastic state, which temperature will be below that at which decomposition if a thermoplastic material is being processed, or curing in the case of a thermosetting material, can take place even if retained in the heating zone for a relatively long time.

As applied to the treatment of thermoplastic materials, the process of this invention contemplates first preheating the material to a moderately plastic state, and then producing a sudden rise in temperature therein by causing the material to pass through a stricture or strictures and dissipating a known and controlled amount of pressure, thus generating heat by the dissipation of mechanical energy and producing a known rise in temperature in the material so as to render the material of a consistency suitable for injection molding or for extrusion into strands. While it is easy to heat thermoplastic materials to the early plastic stages, it is difficult, however, to heat them to a thoroughly plastic condition without injuring the material. The main obstacle arises from the fact that all the common thermoplastic molding materials are poor conductors of heat and do not therefore become plasticized by heat quickly. Furthermore, the extent of injury to the material caused by heating is a function not only of the temperature but also a function of the time to which the material is exposed to a given temperature. Hence, exposure of the material to high temperature for too long a period will result in decomposition or injury of the material. On the other hand, exposure of the material to the same high temperature for a short period might not produce appreciable injury to it.

By my process the material will normally be heated to the early stages of plasticity by contact means after which further heating of the material to the higher temperature necessary for rendering it in a plastic and easily workable condition will be effected by the dissipation of mechanical energy, the said dissipation of mechanical energy being effected by forcing the material through one or more orifices or strictures causing a controlled and known amount of pressure to be dissipated as the material passes through the said orifices or strictures. Dissipation of a known pressure will occasion a known rise in temperature in the material.

As applied to the treatment of thermosetting materials these materials will normally be heated according to the method of this invention by contact means to a slightly plastic or non-curing state, or at least a state at which curing would not take place rapidly, and the heating of these materials to a higher temperature and curable state will be accomplished as previously described by the dissipation of mechanical energy. The material flows directly from the pressure-dissipation orifice or stricture to the mold or to the extruding die, as the case may be, and in a short interval of time it becomes completely cured because its temperature is maintained for a period of time sufficient for the chemical action of curing to be completed. If molded articles are to be produced, the mold will be continuously heated; if extruded strands are to be produced the space into which said strands are extruded will be continuously heated.

In certain specific cases, my process may further include the injection of curing agents, accelerators or other chemicals into the material just before it enters the region or regions wherein pressure is dissipated. It is to be explained that certain types of thermosetting materials which are very sensitive to curing agents and accelerators cure too quickly in the presence of these chemicals and therefore cannot well be prevented from "setting-up" in the heating chamber before they can be extruded or injected. Hence, my process provides a way by which such materials may be advantageously handled whereby at least part of the accelerators or curing agents may be injected immediately before the material enters the region or regions where pressure-dissipation occurs.

The term "accelerator" as used here refers to a material which acts as a catalyst and hastens the curing action. The word "curing agent" is to be understood to refer to a material which actually enters into the chemical reaction of the curing or setting process. Hereinafter, the term "hardening agent" will be used in the specification and claims and is to be understood as defining and including both accelerators and curing agents.

The invention will now be described with respect to its application to injection molding of molded articles.

In present injection molding machines a plunger applies pressure to cold granular material in a cylinder, forcing the material through restricted passages in a heating chamber and thence through the nozzle of the injection machine into a mold. A considerable portion of this pressure is consumed in forcing the cold or semicold material through the passages of the heating cylinder, often leaving comparatively little pressure available at the nozzle itself. The time interval between injection cycles and changes in temperature within the injection cylinder will produce widely varying amounts of pressure available at the nozzle. Again, the hydraulic pumps of present injection molding machines while capable of developing a given high pressure to which they have been adjusted are often not capable of maintaining this pressure throughout the injection stroke. It follows, of course, that such energy as is applied to the injection ram of injection molding machines is dissipated somewhere during the injection cycle, and that this mechanical energy is converted into heat. As pointed out, however, a considerably large portion of the energy may be consumed in forcing the cold material through the passages of the heating cylinder, thereby producing part of the heating effect which is the duty of the heating cylinder itself. While present injection molding machines can dissipate some pressure through the injection nozzle thereby adding additional heat to the plastic material passing through the nozzle, there is provided no means of controlling the amount of pressure dissipated and it varies greatly with the conditions of injection molding. In accordance with the method of my invention, however, the material is first heated to a moderately plastic state in the lower temperature range after which a known and substantially constant amount of pressure is applied to said plastic material to force it through one or more orifices or strictures thereby generating a known and predetermined amount of temperature rise in the plastic material passing therethrough sufficient to bring it to a thoroughly plastic condition.

The following example will serve to illustrate the method of determining the rise in temperature of the material passing through a restricted region or regions. In this example it is assumed that all the heat dissipated goes into the material to be rendered plastic and that none of the heat is conducted away by the metal of the machine and dissipated elsewhere:

Assume the pressure at the entrance of the restricted region to be 20,000 pounds per square inch. Then the energy dissipated per cubic inch of material passing through the restricted aperture or apertures will be 20,000 inch pounds or 1,666.66 foot pounds of energy. Dividing this figure by 778 (the mechanical equivalent of heat) the quotient will then be 2.14 B. t. u.'s, which represents the amount of heat generated per cubic inch of material passing through the restricted points. If the density of the resin material to be injected is .05 pound per cubic inch and the specific heat is 0.4, the total amount of temperature rise will be $2.14 \div .05 \div 0.4$ which equals 107 degrees F.

The injection molding apparatus of this invention includes a means of heating the material to the aforementioned state of moderate plasticity and also a means of assuring that substantially constant pressure is applied to the material throughout the injection period.

The means illustrated in the drawings and hereinafter described in detail in the specification comprises a hydro-pneumatic accumulator, and a press constructed in accordance with and embodying the invention, the press including feed means by which the plastic material is introduced into an injection cylinder containing a ram which acts or operates to push the plastic material forward through a nozzle in conjunction with a valve mechanism and to force out a solid stream or mass of the material into a suitable mold or die. The hydro-pneumatic accumulator has a gaseous volume considerably larger than the volume of the hydraulic cylinder which is employed in the hydraulic system for operating the injection ram. Gas under high pressure will force hydraulic fluid from the hydro-pneumatic accumulator into the hydraulic cylinder which actuates the injection ram. If the gaseous volume in the hydro-pneumatic accumulator is sufficiently large in proportion to the volume of the hydraulic cylinder associated with the injection ram there will therefore be only a small reduction in pressure during a stroke of the injection ram.

The pressure at which the injection machine operates may be varied by pumping hydraulic liquid in or out of the hydro-pneumatic accumulator thereby varying the gaseous volume of said accumulator. Also, gas may be added or removed from the hydro-pneumatic accumulator from time to time by means of the refill line.

The injection pressure will be further controlled by a pressure regulating valve mechanism which will insure that no material can enter the mold until the desired pressure has been developed in the injection cylinder and also for the purpose of restricting or throttling the flow of material in order to assure that the desired constant or substantially constant pressure is dissipated. The pressure regulating valve will ordinarily be so adjusted that it requires almost all of the pressure of the hydro-pneumatic accumulator to open it.

This combination of the hydro-pneumatic accumulator and the pressure regulating valve provides for the control of pressure which will insure the dissipation of a constant or substantially constant amount of pressure at the orifice or strictures thereby generating a known rise in temperature in the material passing through the stricture or strictures.

The principle of dissipating controlled pressure within the flowing plastic material is the foundation of this invention. Other means of providing the pressure and exercising the control of said pressure may be employed than the means disclosed in the embodiment shown in the drawing but it is to be understood that the present invention covers all such changes that may be resorted to without departing from the spirit and scope of my invention, provided such changes fall within the scope of the appended claims.

The term "pressure-dissipation orifice or stricture" has been used and it is to be explained that all of the pressure will not generally be dissipated at one single stricture as the material passes from the automatic pressure regulating valve at the nozzle of the machine and hence into the mold. Thus, if the valve is relatively large and the nozzle relatively small, most of the pressure would be dissipated at the nozzle. On the other hand, if the valve is small and the nozzle large, most of the pressure will be dissipated at the valve. Again, the strictures produced by the gates of the mold might present more resistance than both the valve and nozzle if said gates or apertures entering the mold cavities are small. Just where the pressure is dissipated is not important so long as it is dissipated after the material has been brought to a known temperature and state of plasticity. Present injection molding machines do not bring the material to a known temperature and state of plasticity before dissipating the injection pressure, and again no particular precaution is at present taken to ensure that a known and uniform pressure is applied throughout the injection stroke as has been previously pointed out.

It is to be emphasized that by the process of my invention considerably more heat will be added to the material by the dissipation of pressure after the material has been brought to a plastic state than is the case with present injection molding machines. That is, a larger proportion of heat will be added to the material by dissipation of energy and a smaller proportion by contact heating, and most important, control is exercised over the amount of heat that is added to the material by dissipation of pressure within the flowing material.

This process will be less "heat-rough" on the material than is the case with present injection molding machines. My invention therefore provides a means of producing a very sudden rise in the temperature of the material which has already been brought to the early stages of plasticity. This means, as previously stated, is that of causing the flowing material to be subjected to the dissipation of a known and controlled amount of pressure, thereby generating a known temperature rise in the material.

The extrusion process differs from the injection molding process in that the former is continuous whereas the latter is carried out in cycles.

In the extrusion process the salient feature of my invention is that of providing a means of quickly applying heat to the material by subjecting it to the dissipation of a controlled amount of pressure. In the case of thermosetting plastics extrusion will be possible by my process whereas a slower means of heating the material would almost certainly produce curing of the material in the apparatus before it reached the extrusion die. To date, thermosetting plastics have not been to my knowledge commercially extruded into strands.

In the extrusion of thermoplastic materials, the feature of my invention which provides for suddenly increasing the temperature of the material by subjecting it to the dissipation of a controlled amount of pressure solves a heating problem that would be difficult to accomplish by slower and more cumbersome means of heating without injury to the material. Also, my process enables the material to be heated to a higher temperature because the time of exposure to this temperature is much shorter than would be required by contact means of heating the material. Here it is to be pointed out again that decomposition or injury to the plastic materials is a function of both temperature and time. My invention provides for a greatly reduced time period necessary to expose the material to high temperature.

In carrying out the extrusion process the material to be extruded is subjected to a controlled pressure, which pressure is dissipated as in the previously described injection molding process. Since the extrusion process is continuous a means must be provided for the continuous application of the aforesaid pressure and at the same time provision must be made for a constant rate of flow of the material through the extrusion apparatus in order that strands of uniform size and cross section will be produced. As will be hereinafter described in detail the particular apparatus illustrated includes a means for providing uniform flow of material through the extrusion apparatus, while subjecting it to the desired pressure.

The means in the apparatus shown is a pump designed to deliver a uniform volume of material and the pump forces the previously prepared flowable material through the variable aperture of a pressure regulating valve mechanism which insures that the desired amount of pressure is dissipated by varying the area of cross section of the aperture or stricture in the valve through which the material flows.

From the extrusion die the continuously extruding material will ordinarily be subjected to heating action in the case of thermosetting materials in order to complete the curing of said materials. To accomplish this heating action the strands will normally be drawn through a long vertical stack or cabinet through which heated air is circulated. Heat of course may be supplied by suitably jacketing the stack or cabinet. It is to be pointed out that the purpose of the stack or cabinet is not necessary to add further heat to the extruding material or strands but to maintain the temperature of the strands as they issue from the extruding die or dies.

If, on the other hand, a thermoplastic material is being extruded the stack or cabinet will be cooled by circulating cool air through it or by other suitable means in order to cool and harden the extruded strands as they issue from the die and pass downwardly through the stack or cabinet.

Another variation of this process may be its application to the extrusion or spinning of a dispersion of casein or other protein matter in an alkali solution. In this case the extrusion would be carried out the same as for thermosetting materials in general except that a metered amount of formaldehyde, or other reacting chemical materials heretofore referred to as hardening agents, would normally be introduced immediately ahead of the point of pressure dissipation. The heat generated during pressure-dissipation will produce a temperature rise in the materials and aid chemical reaction between the formaldehyde or other chemical agent employed and the casein or other protein matter dispersed in the aforesaid alkali solution. The heat generated in the stack or cabinet will further cure the casein or protein extruded strands and will also serve to drive off some of the aqueous material contained in the original alkali dispersion of protein. In effect, this will result in a dry process for spinning casein or other protein. The term "other protein" may relate to numerous protein materials but it refers principally to protein extracted from soy beans, as this is the most common substitute for casein protein. This process as applied to the casein and other protein materials is a special application to thermosetting materials in which the present known curing agents could likely not be added to the material at the beginning of the process without causing the immediate curing of the material in the apparatus.

As for the thermoplastic materials that may be applicable for extrusion by the method of the present invention I mention plasticized cellulose acetate, cellulose acetate butyrate, ethyl cellulose, and the vinyl compounds. Here again the main advantage gained is in the unique means of heating the material to an extrudable state without injury of the said material. Other thermoplastic materials that should be applicable to the extrusion by my process are the polyamides which when spun into yarn are known under the trade-mark "Nylon."

These and other features of the invention will be best understood and appreciated from the following description of several forms of apparatus diagrammatically illustrated by way of example in the accompanying drawings and adapted to carry out the method of my invention, in which.

Figure 1:
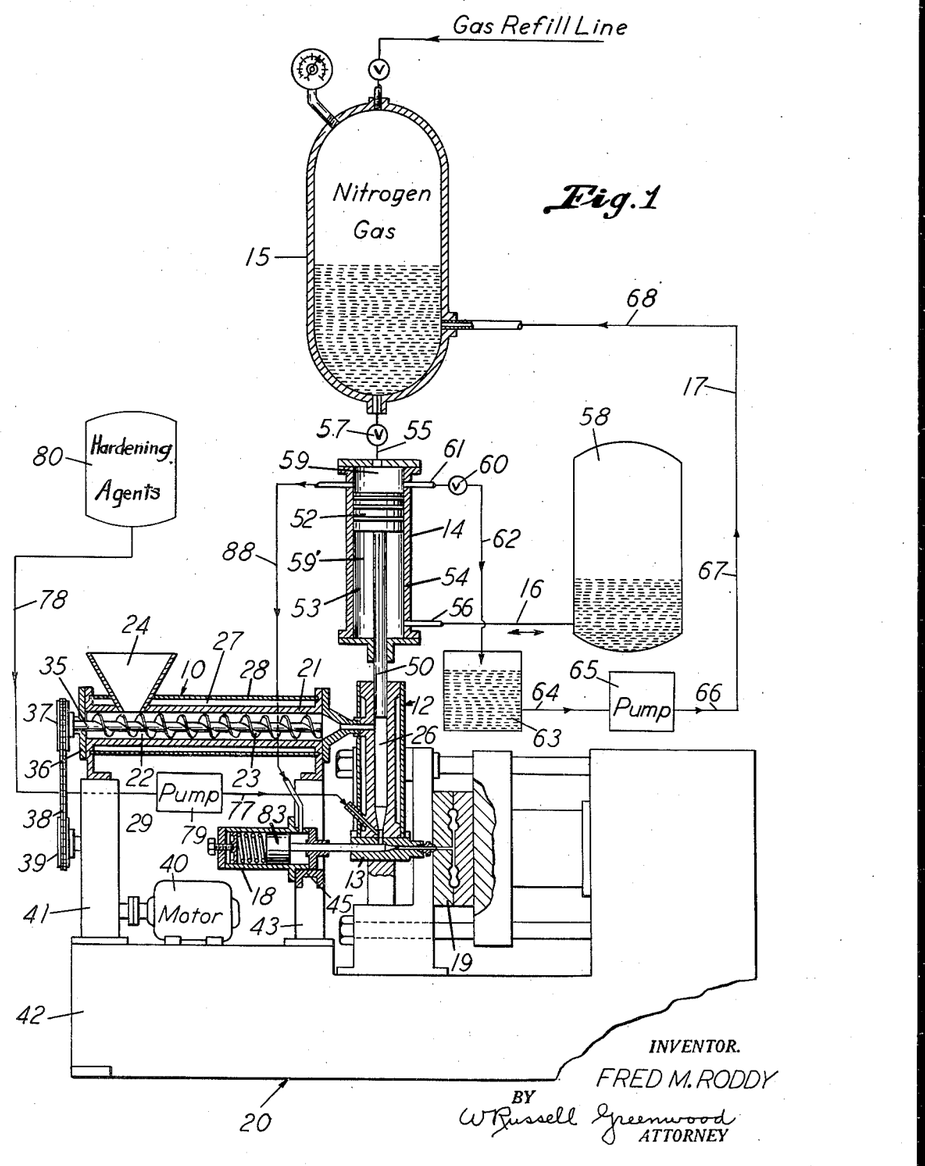
Fig. 1 illustrates in side elevation one embodiment of an injection molding apparatus for carrying out the process of my invention and showing in section a hydro-pneumatic accumulator and cooperating parts of an injection molding press with the heating, feeding and injecting mechanisms and the die members of the press being illustrated in their respective positions assumed at the start of the injection molding operation.

Referring to the drawings in detail, Fig. 1 shows the general construction of the injection molding press and the feeding and pressure applying assemblies associated therewith, together with the hydraulic circuits interconnecting the various elements. The injection molding apparatus constituting one form of my invention may assume and be made up of several units all arranged in combination and in cooperating relationship and comprises a feeding and preliminary heating unit 10; an injection unit 12, including an injection nozzle head 13, a hydraulic pressure unit 14 including a hydro-pneumatic accumulator 15, the hydraulic circuits 16 and 17, the automatic pressure control valve mechanism 18, the mold assembly 19, and the mold operating press 20.

In the practice of my process the hopper 24 of the feeding and preliminary heating unit 10 is charged with a quantity of either a suitable thermoplastic or of a thermosetting composition, in granular or powdered form. Illustrative examples of some of the thermoplastic compounds that have the necessary characteristics to render them suitable for use in the practice of my invention are the following compounds usually treated with suitable plasticizers: Cellulose acetate, cellulose acetate-butyrate, vinylidene chloride resins, polyvinyl acetal resins, and ethyl cellulose plastics. Examples of thermosetting compounds are: phenolic resins, urea phenolic resins, casein and other protein plastics.

Figure 2:
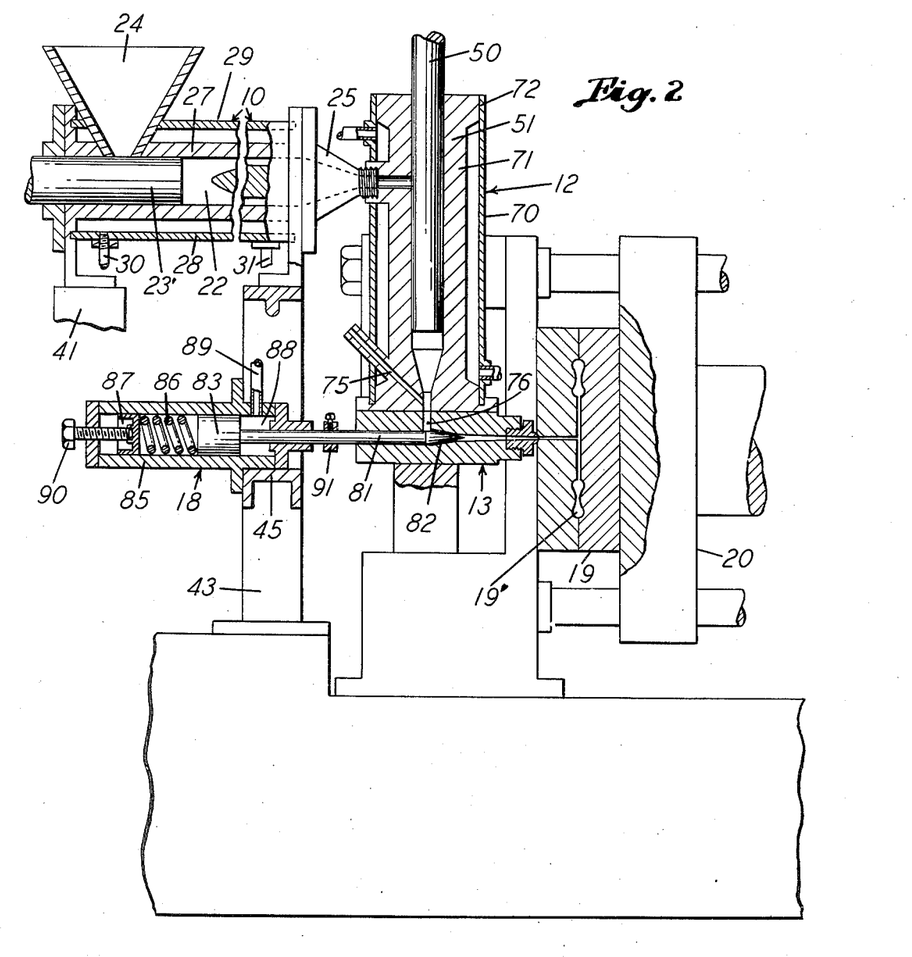
Fig. 2 is an enlarged view of the portion of the press shown in Fig. 1 containing the charging, heating, feeding and injecting mechanisms thereof, but with a plunger type of material feeding mechanism being substituted for the screw feed shown in Fig. 1, and showing the positions of the various cooperating parts after the injection molding operation has taken place.

As shown in Fig. 1 and in enlarged detail in Fig. 2, the feeding and preheating unit 10 comprises a cylinder 21 having an internal heating chamber 22 which contains a close-fitting conveyor screw 23 as is shown in Fig. 1, or a ram 23' in the form shown in Fig. 2, either of which feeding members acts to move the cold material from the feed hopper 24 through the preliminary heating chamber 22 where it is heated to a state of moderate plasticity, and to move this plastic mass forwardly out of the heating chamber 22 through the funnel-like head 25 at the forward end opening of the chamber 22 into the injection chamber 26 of the injection unit 12. The hopper 24 is initially charged with a quantity of a suitable thermoplastic or of a suitable thermosetting material in a granular or powdered state.

The chamber 22 has double walls 27 and 28 which form a heating jacket 29 through which a suitable heating fluid, such as hot oil, may be passed by means of suitable conducting pipes 30 and 31. The chamber 22 is maintained at a temperature high enough to soften the cold granular material passing therethrough and bring it to a condition of moderate plasticity without heating it to a temperature high enough to injure or decompose the material in the case of thermoplastic compositions or to cure the material in the case of thermosetting compositions. If desired, the chamber 22 may be heated by an electrical resistance element encircling the wall 27 of the chamber 22 instead of by the circulation of a heating fluid through the heating jacket 29.

The screw 23, if desired, may also be made with a hollow shaft so that a heating medium may be conducted therein to further heat the material in the chamber 22. The shaft 35 of the screw 23 is journaled in a suitable stuffing box 36 suitably attached to the rear end of the cylinder 21 and is rotated by the sprocket 37 mounted on the shaft 35 and driven by the sprocket chain 38 and the sprocket 39 which may be rotated by any suitable source of power, applied thereto, such as by the electric motor 40 and the speed reduction gear unit 41.

The feeding and preheating units 10 in the forms shown in Figs. 1 and 2, are mounted in an elevated and horizontal position on suitable supports upon the bed 42 of the mold operating press 20, one of which supports in the arrangement there shown is the speed reduction unit 41 and the other support being shown at 43 and which has two spaced legs 44 and a cross-bar 45 on which the automatic pressure control mechanism 18 is mounted so as to be positioned beneath the cylinder 21.

The injection unit 12 comprises a ram 50 reciprocable in the chamber 26 of the vertical injection cylinder 51 and actuated by the piston 52 which is mounted on the opposite end of the ram and reciprocable in the chamber 53 in the hydraulic cylinder 54 of the hydraulic pressure unit 14. The cylinder 54 is alternately supplied with oil or other fluid under high pressure, such as for example, 1000 to 2000 pounds per square inch, through pipes 55 and 56, the oil being supplied through pipe 55 under pressure from the hydropneumatic accumulator 15 to actuate the ram 50 during its injection stroke and being controlled by a suitable valve 57 which is closed when oil at lower pressure is supplied to the hydraulic cylinder 54 from the low pressure reservoir 58 to cause retraction of the ram 50 longitudinally of the chamber 26. Thus, when the valve 57 is open high pressure fluid enters the space 59 of the chamber 53 above the piston 52 and forces the said piston and the ram 50 downwardly and the composition in the chamber 26 is forced by the ram through the outflow passages of the lower end of the injection cylinder 51 and past the pressure regulating valve mechanism 18 and expelled from the injection nozzle, into the cavities 19' of the mold assembly 19.

Oil or other hydraulic fluid employed and supplied from the low pressure reservoir 58 fills the space 59' of the hydraulic cylinder 54 below the piston 52 so that the downward movement of the piston and the ram as they are forced in that direction by the high pressure fluid from the accumulator 15 causes the piston to apply pressure to the oil contained in the space below it and to force this oil out through the pipe 56 into the low pressure reservoir 58. Only such pressure as is needed to withdraw or return the plunger 50 and its actuating piston 52 need be maintained in the reservoir 58.

During the retracting movement of the ram 50 by the piston 52 when actuated by the flow of oil from the low pressure reservoir 58 back into the space 59' of the hydraulic cylinder 54 below the piston, the valve 57 will be closed and a valve 60 will be opened so that the oil trapped in the space above the piston will be forced out through the pipes 61 and 62 and discharged into the open reservoir 63 from which it is pumped by pump 65 through pipes 64, 66, 67 and 68 of the hydraulic system 17 back to the accumulator 15. During the injection stroke of the piston 52 and ram 50, the valve 60 is kept closed. Valve 60 is closed when valve 57 is open, and vice versa.

The injection chamber 26 has a heating jacket 70 formed by double walls 71 and 72 through which hot oil or other heating fluid may be passed to maintain the temperature of the plastic material passing through the chamber 26. It is to be understood, however, that the material contained in the chamber 26 has been heated to a flowable consistency prior to being forced into the injection chamber 26 so that the injection ram 50 therefore operates on a plastic material and the energy of the ram 50 is not consumed by forcing cold material through restricted passages as is often the case in present practice.

In the case of certain thermosetting materials suitable hardening agents, such as curing agents and accelerators, may be introduced into the plastic material before it enters the stricture or strictures producing pressure dissipation. As shown in Fig. 1 and more clearly in Fig. 2, a transverse passage 75 is provided for this purpose near the discharge opening 76 of the injection chamber 26 to the injection nozzle assembly 13 and conduit pipes 77 and 78 connected to a pump 79 supply the hardening agents under pressure from the supply reservoir 80 to the plastic mass as it is forced out of the injection chamber. The hardening or curing agents thus are kept out of the body of the material and are incorporated therein just before the material enters the pressure-dissipation region, otherwise introduction of these agents beforehand would cause certain sensitive types of materials to set up in the apparatus. Provision will ordinarily be made to deliver a uniform percentage of hardening agent to the flowing plastic composition.

Referring again to Figs. 1 and 2, the automatic pressure regulating mechanism 18 provided with a plunger valve 81 having a conical end portion movable laterally across the end of the discharge opening of the injection chamber 26 and cooperating with the tapered bore 82 of the head 13 prevents any of the plastic mass from passing out from the injection chamber until a predetermined amount of presure has been reached at this point. The plunger 81 is slidable within the head 13 and is actuated by means of a piston 83 which is mounted upon the other end of the plunger 81 and reciprocable in the cylinder 85. A spring 86 interposed between the piston and the adjustable abutment member 87 normally tends to urge the piston 83 and the plunger 81 into a closed position across the discharge opening 76 when the pressure of the oil in the upper portion of the cylinder 54 is not sufficient to provide the predetermined pressure for injecting the plastic composition of the type employed. The space 88 of the cylinder 85 in advance of the piston 83 is connected by conduit pipe 89 to the space 59 of the cylinder 54 above the piston 52 whereby high pressure oil will be supplied from the upper space of the chamber 53 to the space ahead of the piston 83 of the pressure regulating device so that the plunger valve 81 will move to the left of the position shown in Fig. 2, such as, for example, the position represented in Fig. 1, and into various intermediate positions, to maintain the desired and predetermined pressure at the injection orifice of the nozzle head 13. If the pressure at the injection orifice should go down, which of course means that the pressure in the space 59 of the cylinder 54 has gone down, the plunger valve 81 will be moved into the head 13 by the action of the spring 86 to restrict the flow of the plastic mass from the injection chamber 26 and thus will produce throttling. The valve 81 therefore functions to maintain a predetermined pressure at the injection orifice and throttling results when the pressure drops below that to which the mechanism has been present. Adjustment of the valve mechanisem 18 to vary the amount of pressure to be dissipated is accomplished by adjusting the screw 90 in the proper direction which either increases or decreases the amount of loading upon the spring 86. A stop 91 is provided to limit the backward movement of the valve plunger 81 when the piston 83 is urged backward against the force of the spring 86 by means of the hydraulic fluid introduced into the space 88 in the cylinder 85 through the pipe 89.

In the injection molding operation the size of the injection nozzle should preferably be selected so that the proper rate of injection may be obtained with the valve 81 wide open. Therefore, throttling need not ordinarily occur in the injection molding operation but will take place if the strictures provided between the pressure regulating valve and the mold cavities are too large, thus not affording the necessary resistance to maintain the present pressure required on the plastic material in the space 26 within the injection cylinder 12. The foregoing is so much as to say that if the strictures of the system are comparatively large a rapid movement of the piston will be necessary in order to dissipate the required pressure and flow of fluid from the high pressure accumulator 15 through the valve 57 and connecting pipe 55 will be so rapid that frictional loss through these parts will lower the hydraulic pressure in the upper space 59 of the cylinder 54 thereby tending to close the pressure regulating valve, producing throttling.

The gas space in the hydro-pneumatic accumulator 15 should be so large in proportion to the volume within the cylinder 54 that a full stroke of the plunger 50 does not appreciably diminish the pressure in the hydro-pneumatic accumulator.

After the mold 19 has been filled with the injected composition, the mold will be held closed usually under full injection pressure for a few seconds. This time interval is required in the case of thermoplastic materials in order to force enough material into the cavities to compensate for the shrinkage of the molded parts during cooling. In the case when thermosetting materials are injected molded the time interval is that required to permit the curing of the hot material within the mold cavities. As previously explained the mold will be kept relatively cool when thermoplastics are injected and will be kept hot when thermosetting materials are injected.

The invention is not limited to the above-described arrangement of the various mechanisms, such disclosed means constituting, however, but one of the various mechanical forms in which the principle of the invention may be used, and it will be obvious that different arrangements of the positions of the injection unit 12 and the mold closing press 20 may be used without departing from the principle of the present invention.

The extrusion process of this case is functionally similar and parallels that of the injection molding process just described except that the process is continuous. This apparatus will be used in order to provide uniform and continuous flow of the material by the essential and fundamental feature of the invention which comprises subjecting a flowable mass of the plastic material to the dissipation of terrific pressure in the flowing material in order to provide a sudden increase in temperature.

The extrusion process is also applicable to the continuous extrusion of both thermosetting and thermoplastic materials.

In the case of thermoplastic materials the dissipation of high pressure serves as a means of quickly heating the material without the necessity of subjecting the said material to a comparatively long period of contact heating thereby being more "heat rough" on the material.

In the case of thermosetting materials, these materials will be heated to a temperature which will afford moderate plasticity but will not produce rapid curing of the material in the heating chamber of the machine. When this moderately plastic material is then subjected to the dissipation of terrific pressure as the said material is forced through suitable orifices or strictures, the material becomes heated to a temperature at which it will cure rapidly. On leaving the region or regions of pressure dissipation the material will be led through suitable dies where it is extruded into strands which are led downwardly through a vertical stack or cabinet which is maintained at a high temperature by circulating hot air or other means in order to maintain the high temperature of the extruding strands a sufficient period of time to permit curing of the material.

When thermosetting materials are extruded certain types of material may have the characteristic of curing very quickly if the hardening agents are added to the material before heating the material to moderate plasticity in the heating chamber, and in this case it is proposed to inject suitable hardening agents into the flowing material just as it enters the region of pressure dissipation. The turbulence produced in pressure dissipation will thoroughly mix the hardening agents and the materials, and the combined effect of the hardening agents and the increased temperature resulting from the said pressure-dissipation will cause the extruding strands to cure very quickly. At the same time this permits the material to be preheated without the presence of accelerators or hardening agents and since the material is less sensitive to curing in this condition it may be retained in the heating cylinder long enough to attain a moderate plasticity and then be forced through the pressure dissipation region immediately ahead of which the hardening agent has been injected.

Figure 3:
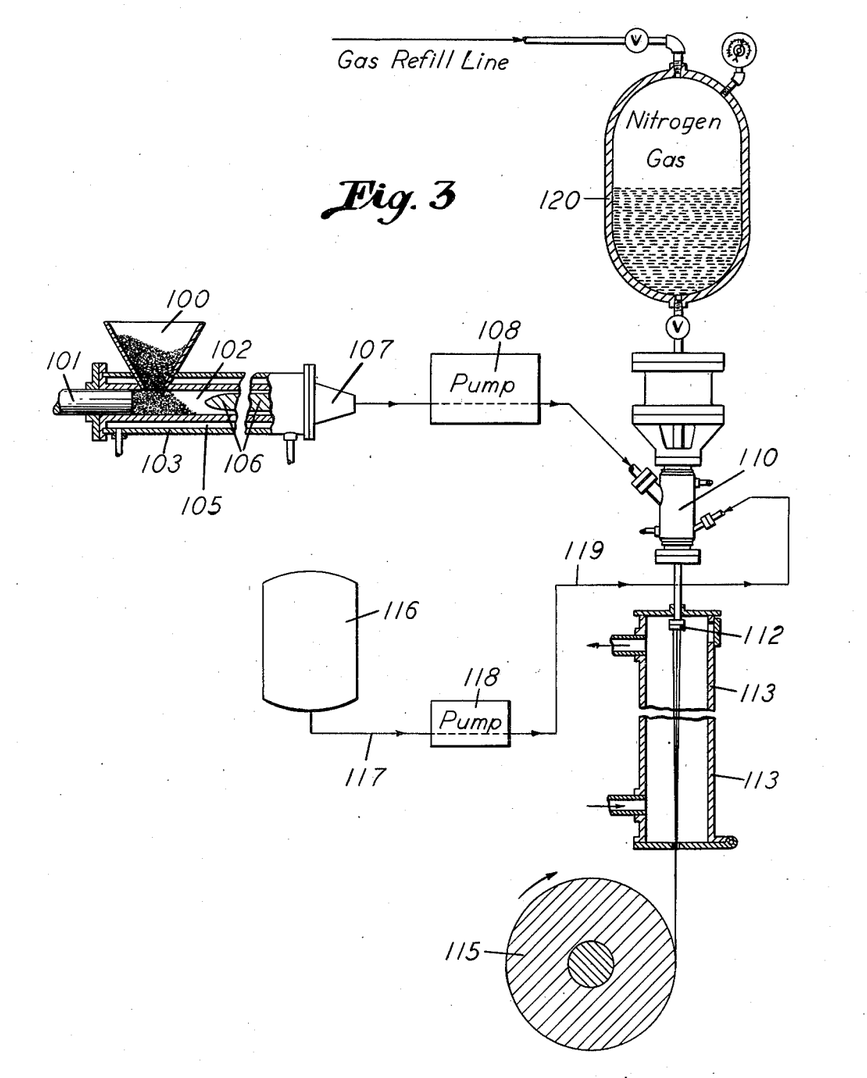
Fig. 3 is a schematic view which shows my invention as applied to continuous extrusion.

Referring to Fig. 3 there is illustrated diagrammatically one form of extrusion apparatus for the production of extruded strands according to the continuous extrusion process of my invention. In the hopper 100 a charge of any thermoplastic or thermosetting material is introduced in granular or powdered form. The reciprocable ram 101 is then forced inwardly of the heating chamber 102 which is of suitable length, and the forward movement of this ram forces the material introduced into the chamber 102 from the hopper 100 into the zone of the chamber 102 which is already slightly heated, through the heating jacket 103 which is heated by a heating medium flowing through the channel 105 or by means of electrical coils or other known arrangements of heating. The compressed material then arrives at the portion of the heating chamber where dividing of the mass commences, as it engages the torpedo 106. The torpedo 106 has a tapered nose which is first engaged by the compressed material advancing through the heating chamber 102, and the torpedo is disposed axially of the heating chamber in spaced relationship with respect to the inner wall thereof so that the material passing through this section of the heating chamber is shaped into tubular form having thin walls. It is in this section that the material softens, i. e., it becomes flowable and of moderate plasticity but will not be maintained at so high a temperature that decomposition will result in the case of a thermoplastic material or curing will be produced in the case of a thermosetting material.

The compression ram 101 is retracted, a second charge of granular material drops into the inlet zone of the heating chamber 102, and the ram is then forced inwardly of the heating chamber whereby the newly introduced material follows the same path through the heating chamber as previously described and the previously introduced material which is already moderately plastic or semi-plastic is forced forward of the torpedo 106 and through the nozzle 107 from which it is extruded in a flowable and not hardened condition and passes thence to a positive streamline flow pump 108 which is illustrated diagrammatically and by which the flowable mass is fed to the pressure-dissipation valve device 110. It will be noted that the torpedo 106 serves to spread the material into thin sections thereby facilitating heating.

The soft, easily flowable extruded material as it issues from the orifice of the pressure-dissipation valve device 110 is forced through the extrusion die 112 disposed within the vertical stack or cabinet 113 and the extruding strand or strands from the die 112 caused to pass through the stack or cabinet where they are conditioned by the temperature conditions therein to produce a hardened strand or strands suitable for winding without sticking upon the positively driven drum 115. Thus, in the case of thermoplastic material the extruded strand or strands after being forced from the extrusion die 112 are cooled in passing through the stack or cabinet 113 through which cool air is circulated to produce a hardened strand or strands. In the case of thermosetting material hot air is circulated through the stack or cabinet 113 to maintain the high temperature of the strands a sufficient length of time to permit curing and hardening of the strands.

Also, in the case of certain types of thermosetting materials, various hardening agents, such as curing agents or accelerators, stored in the storage receptacle 116 are withdrawn via conduit 117 through pump 118 and thence via conduit 119 and discharged into the mass of plastic material just as it enters the region of pressure dissipation at the lower end of the valve device 110.

The streamline flow pump 108 is of the positive type and capable of developing a very high pressure. The actual pressure developed is automatically controlled by the pressure-dissipation valve device 110. The pressure to be dissipated in proportional to the gaseous pressure acting upon the fluid in the tank 120 and may therefore be set at will by adding or removing gas from said tank. The actual functioning of the pressure-dissipation valve device will be explained hereinafter as the description proceeds.

Figures 4, 5, 6:
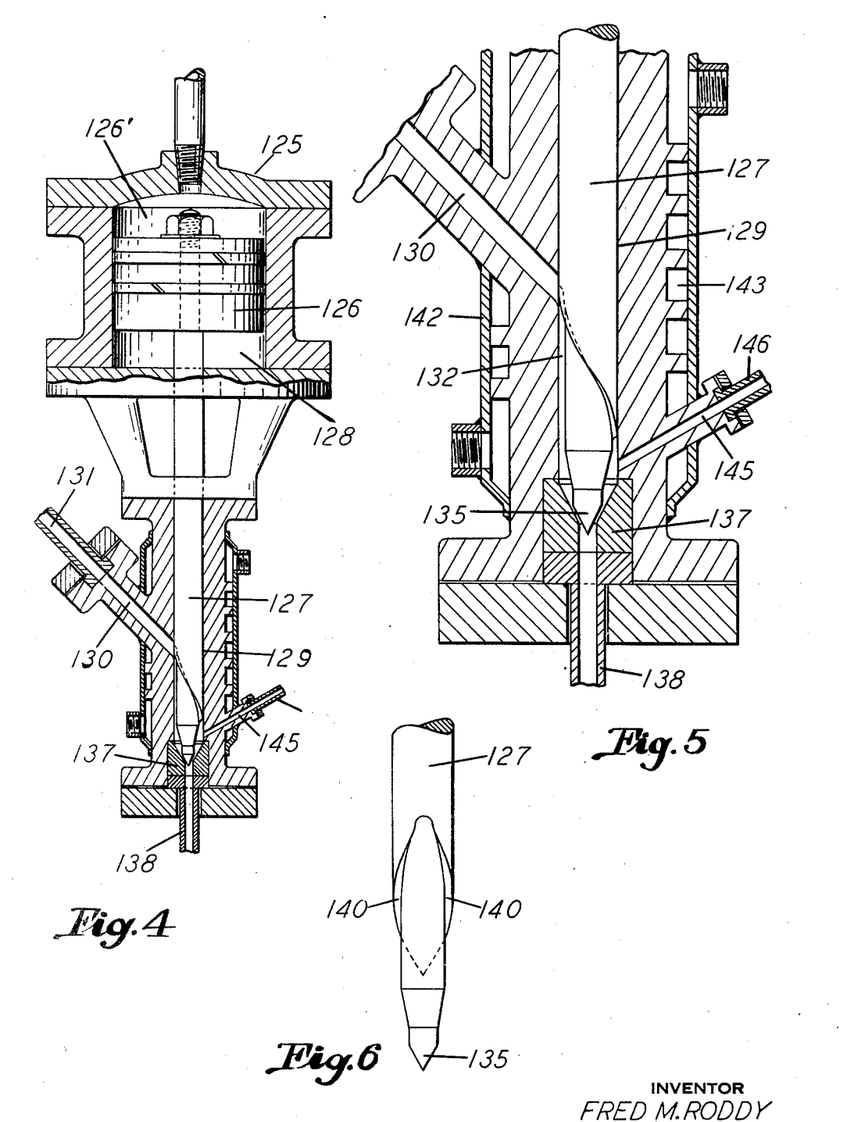
Fig. 4 is a side elevational view partly in section of my automatic pressure-dissipation valve device.
Fig. 5 is a fragmental view on enlarged scale of the lower portion of the valve shown in Fig. 4 showing the construction of the pressure-dissipation portion of the valve in detail.
Fig. 6 is an enlarged view of the lower portion of the valve plunger of the pressure-dissipation valve device.

In Fig. 4, one specific form of pressure-dissipation valve device 125 is illustrated with portions thereof shown in section. This pressure-dissipation valve device has the same function as the valve mechanism 18 illustrated in the injection molding apparatus previously described but a somewhat different construction is used to make the said pressure-dissipation valve device more readily suited to the throttling action required by the continuous extrusion process.

In the illustrated embodiment shown in Fig. 4, a piston 126 mounted on the upper end of the plunger 127 and slidable in the cylinder 128 of the head of the valve device 125 is normally urged downwardly in the cylinder 128 by fluid under high pressure from the partly gas and partly fluid filled tank 120. This downward movement of the piston 126 causes the plunger 127 to be pressed down in the cylinder 129 of the pressure-dissipation valve. The plastic mass is introduced by the pump 108 through the oblique channel 130 in the side wall of the cylinder 129 and via pipe 131 into the filling space 132 around the plunger 127.

It will be noted that the pressure exerted by the pump on the plastic mass in the region 132 will tend to force the plunger 127 upwardly removing the conical end 135 of the plunger 127 from its conical seat 136 in the orifice member 137 thereby allowing the plastic material to flow through the valve and outwardly from the exit opening thereof through the pipe 138 which leads to extrusion die 112 shown in Fig. 3. It will be seen that a throttling action is thus produced and that the pressure dissipated in the flowing plastic mass as it passes through the pressure-dissipation valve device may be regulated by controlling the pressure within the space 126' above the piston 126. The pressure in the space 126' is of course the same as the pressure in the tank 120 illustrated in Fig. 3.

As shown in Fig. 6 the plunger 127 is profiled to provide symmetrical tapered end portions 140 spaced well back from the conical end 135 for the purpose of producing the filling space around the plunger and causing the dividing of the plastic mass about the plunger as it is introduced from the channel 130. It will be noted that this construction permits streamline flow through the valve and that there are no "dead" places where material can collect or lodge and be injured by its long contact with the heated surfaces. Also, the valve is self-cleaning and permits following one color after another without dismantling of the valve for cleaning.

It will be obvious that the plunger 127 could be loaded by means of a spring instead of the hydraulic cylinder 125. The spring, however, would be less sensitive and the hydraulic method is preferred.

The cylinder 129 has double walls and is heated by the heating jacket 142 which in turn is heated by a suitable medium flowing through the space 143 thereby serving to maintain the temperature of the material flowing through the cylinder.

If desired, in the case of certain thermosetting materials suitable hardening agents may be introduced into the stream of plastic material via oblique side conduit 145 and pipe 146 just before the plastic material enters the region of pressure dissipation of the orifice member 137.

It is to be noted that while the pressure dissipation feature is substantially the same in the case of this valve as for injection molding this valve has been illustrated somewhat differently and in general would be larger than the automatic pressure control valve shown in conjunction with the injection molding apparatus previously described above. Also, in the extrusion process and apparatus the valve has been designed for throttling whereas it has been previously stated that throttling need not necessarily take place in the injection molding process if the passages of the system are properly proportioned and a somewhat different valve construction was therefore provided.

It will be understood that in each of the foregoing embodiments of the invention the passages of the respective conduits and chambers through which moves the material to be processed for continuous extrusion or for injection molding are shaped and proportioned so as to bring about a streamline flow of the material so that none will remain in or become stagnant in the system.

It will be seen that in accordance with my invention I have provided a simple and economical method of quickly heating a thermoplastic and a thermosetting material to a plastic state and fashioning said heated plastic material either by injecting it into a mold or molds or by extruding into strands. In the case of thermoplastic materials my unique method of heating by controlled pressure dissipation, after the material has been preheated to a state of moderate plasticity, is employed in order to shorten the heating period and produce less injury to the material.

In the case of thermosetting materials on the other hand my unique method of heating by controlled pressure dissipation, after the material has been preheated to a moderately plastic state, is employed because it is the only practicable method of heating such materials without producing curing or setting up of the materials in the heating chamber itself. The final addition of heat by the pressure dissipation process of my invention brings the material to the curing temperature.

Aside from the above function the present process aids in bringing into solution materials which are difficult to dissolve with each other inasmuch as the turbulence and the heat generated during pressure dissipation tend to disintegrate all solid particles and bring about a powerful dissolving action.

I claim:

1. The method of preparing plastic materials to a workable state for fabrication, which method comprises preheating the material to a temperature high enough to cause it to become moderately plastic but below any temperature injurious to the material, applying a pressure to the moderately plastic material to force it through a resistance orifice and thereby effect a transformation of mechanical energy into heat to produce a rise of temperature in the material to bring it to the desired thoroughly plastic workable state for fabrication, and regulating said transformation by varying the effective flow area of the orifice in accordance with the pressure exerted on the moderately plastic material due to changes in the fluidity of the moderately plastic material.

2. The method of preparing plastic materials to a workable state for fabrication, which method comprises preheating the material to a temperature high enough to cause it to become moderately plastic but below any temperature injurious to the material, applying a pressure to the moderately plastic material to force it through a resistance orifice thereby effecting a transformation of mechanical energy into heat and producing a rise of temperature in the material to bring it to the desired thoroughly plastic workable state for fabrication; the said transformation at the orifice being regulated and controlled by varying the effective flow area of the orifice in accordance with the pressure exerted on the moderately plastic material due to any change in the fluidity of the moderately plastic material so as to insure that a constant pressure will be dissipated at the orifice which in turn will generate a constant amount of heat per unit volume of the material passing through the orifice.

3. The method of preparing plastic materials to a workable state for fabrication, which method comprises preheating the material to a temperature high enough to cause it to become moderately plastic but below any temperature injurious to the material, applying a pressure to the moderately plastic material to force it through a resistance orifice and thereby dissipate a given amount of mechanical energy per unit quantity of material forced through the orifice and add a corresponding amount of heat to the material, and regulating said dissipation by varying the resistance to flow at the orifice in accordance with the pressure exerted on the moderately plastic material due to changes in the fluidity of the material resulting from the said preheating of the material.

FRED M. RODDY.

REFERENCES CITED

The following references are of record in the file of this patent:

UNITED STATES PATENTS

| Number | Name | Date |
| --- | --- | --- |
| 1,370,800 | Egerton | Mar. 8, 1921 |
| 1,997,074 | Novotny | Apr. 9, 1935 |
| 2,107,190 | Shaw | Feb. 1, 1938 |
| 2,111,857 | Jeffery | Mar. 22, 1938 |
| 2,117,179 | Kopp | May 10, 1938 |
| 2,199,144 | Tegarty | Apr. 30, 1940 |
| 2,259,781 | Shaw et al. | Oct. 21, 1941 |
| 2,285,370 | Staelin | June 2, 1942 |
| 2,430,033 | Stacy et al. | Nov. 4, 1947 |